United States Patent [19]

Tripp

[11] Patent Number: 4,744,187

[45] Date of Patent: May 17, 1988

[54] MECHANICAL ROOF FASTENER

[75] Inventor: Scott D. Tripp, Indianapolis, Ind.

[73] Assignee: The Firestone Tire & Rubber Company, Akron, Ohio

[21] Appl. No.: 7,059

[22] Filed: Jan. 27, 1987

[51] Int. Cl.⁴ .............................................. E04D 3/36
[52] U.S. Cl. ...................................... 52/410; 52/512; 52/513; 52/746; 52/747; 24/141; 411/179; 411/542
[58] Field of Search ................... 52/408–410, 52/506, 509, 513, 746, 741, 747, 512; 24/141; 411/179, 2, 542, 545

[56] References Cited

U.S. PATENT DOCUMENTS

| | | | |
|---|---|---|---|
| 998,511 | 7/1911 | Heron . | |
| 3,286,577 | 11/1966 | Weidner | 411/542 |
| 3,918,233 | 11/1975 | Simpson | 52/747 |
| 4,074,501 | 2/1978 | Sandqvist | 52/741 |
| 4,078,351 | 3/1978 | Simpson | 52/536 |
| 4,124,050 | 11/1978 | Ackerman | 411/179 |
| 4,467,581 | 8/1984 | Francovitch | 52/515 |
| 4,476,660 | 10/1984 | Francovitch | 52/515 |
| 4,502,256 | 3/1985 | Hahn | 52/63 |
| 4,519,175 | 5/1985 | Resan | 52/713 |
| 4,520,606 | 6/1985 | Francovitch | 52/410 |
| 4,545,270 | 10/1985 | Dewey | 81/429 |
| 4,603,422 | 12/1986 | Beneze | 52/410 |
| 4,620,402 | 11/1986 | Beneze | 52/410 |
| 4,662,806 | 5/1987 | Reed | 411/2 |

Primary Examiner—James L. Ridgill, Jr.
Attorney, Agent, or Firm—Ernst H. Ruf

[57] ABSTRACT

A mechanical fastener for securing a flexible sheet of an elastomeric material to the upper surface of a roof via the use of a plurality of such fasteners, each of which include upper and lower retaining members, wherein the latter are anchored to the roofing surface. Both of the retaining members are formed with a series of annular concentric ridges and grooves which cooperate with each other to form a series of annular gripping zones with the elastomeric sheet when the upper retainer is drawn into a clamping relationship with the botton retainer by a threaded fastener. The fastener is engaged with an internally threaded central boss formed on the lower retainer. A sharp bottom edge of the fastener cuts an aperture in the elastomeric sheet prior to engagement with the threaded boss. The fastener has a frangible portion which separates upon a predetermined clamping force being exerted on the membrane by the retainers which also retards unauthorized removal of the fastener once the retaining members are in the clamped relationship. A method for securing the flexible sheet to the roofing also is presented.

22 Claims, 3 Drawing Sheets

MECHANICAL ROOF FASTENER

TECHNICAL FIELD

The field of art to which this invention pertains is that of mechanical fasteners and particularly to a fastener for mechanically securing a flexible sheet or membrane to a roof and to the method of applying the same. More particularly, the invention relates to such a mechanical fastener having means which enables the proper amount of clamping force to be applied to the membrane and which retards unauthorized removal of the fastener after installation on a roof.

BACKGROUND ART

A large number of commercial and factory plant roofs are of a flat roof design wherein the roofing material itself is often of a built-up asphalt and in more modern systems of a single ply EPDM elastomeric sheet or membrane. In terms of securing a single ply EPDM membrane to the roof itself, one design utilizes a mechanical ballast system that uses a layer of stone over the membrane. While the ballast system may be least expensive it has a disadvantage of being quite heavy (approximately 10 pounds per square foot) thus requiring a heavy roof support structure and in addition the roof slope cannot exceed 10%.

Adhered roof membrane retention systems suffer from a cost penalty while mechanical fasteners and related fastening systems generally require fixation to the roofing substrate via mechanical fasteners namely membrane penetrating and non-penetrating ones. Each of these types of fasteners has a number of favorable features and each of them is also subject to various drawbacks and disadvantages.

Mechanical fastening systems of the nonpenetrating type generally require fixation of a base member to the roofing substrate followed by a securing of the roof membrane thereto by a top clamping or securing member. Examples of some nonpenetrating type fastening systems for securing a membrane to a roof are shown in U.S. Pat. Nos. 3,426,412; 4,519,175; 4,502,256; 4,617,771; and 4,619,094. Penetrating type fastening systems use various rigid and semirigid members for securing the membrane to the roof. These systems require openings to be formed in the membrane either for inserting a fastening plate therethrough for subsequent attachment to the roof, or formed upon insertion of a fastening anchor or fastener into the roof or lower plate. Examples of some of these prior penetrating systems are shown in the patents set forth below.

U.S. Pat. Nos. 3,918,233 and 4,078,351 disclose the use of a bottom member having a threaded nut which is engaged by a threaded fastener which draws a rigid top plate against a roofing cover located between the two plates, and the use of a single fastener driven through the cover and into the roof.

U.S. Pat. No. 4,074,501 shows another penetrating mechanical fastener in which a single threaded member extends through the roof substrate for clamping a disc-shaped member against a waterproof covering sheet.

A somewhat similar fastener disc is shown in U.S. Pat. Nos. 4,467,581 and 4,476,660 in which the disc-shaped top plate is secured to the roof structure by a linearly extending fastener for maintaining a flexible membrane on the roof.

U.S. Pat. No. 4,620,402 discloses a fastening system in which a rigid lower retainer plate is inserted through an opening formed in the membrane after the membrane has been spread over the roof. The plate then is secured to the roof by one or more fasteners. The membrane is compressed against the anchored lower plate and secured thereto by a rigid upper plate which is clamped to the lower plate by a separate fastener.

Still another type of penetrating roof fastener is shown in U.S. Pat. No. 4,520,606. This fastener consists of a base plate which is secured by separate fasteners to the roof substrate. A membrane is placed over the anchored base plate and clamped thereagainst by a top retainer plate or disc which is secured to the base plate by a separate linear fastener. The fastener draws the top plate into a compressing relationship with the lower plate compressing the membrane therebetween. Spacers are then provided for receiving a mastic material to prevent leakage.

Although both penetrating and nonpenetrating type fastener systems do work satisfactory for many applications, it is desirable to have a penetrating system for certain applications. One problem with nonpenetrating type fasteners is that it is difficult to provide a secure engagement between the top and bottom retainer plates to trap the membrane therebetween should the fastener be located at a splice in the roofing membrane since these splicers generally have a double membrane thickness. Therefore, it is desirable for a roof fastener to be able to satisfactorily maintain the roofing membrane secured to the roof even if the fastener is located at a splice in the membrane.

Another problem that exists with certain of the roof fastening systems is the relative ease with which vandals can remove the exposed locking component or top plate of the fastener. Although this is not a problem for many installations, since the roofs are inaccessible to outsiders, it can be a problem for those buildings that are readily accessible and/or for buildings subject to vandalism such as schools. In many known fasteners, the locking cap or top plate component can be pried off or unscrewed and easily removed requiring only a screwdriver or other readily available tool. It is also desirable in both nonpenetrating and penetrating systems that the fastener be installed in a minimum amount of time and without requiring skilled labor, and that the fastening elements can be securely retained in clamping engagement with the trapped membrane to reduce the accidental disengagement thereof upon the membrane experiencing severe uplift wind forces. These uplift wind forces at times become substantial on the individual fasteners and occasionally can result in the membrane stretching and pulling out from between the clamped fasteners. It has been found that a relatively flat clamping surface between abutting fastening elements or plates provides less resistance to the pulling out of the membrane therebetween than if a changing surface contour is provided for the clamping area. However, no sharp corners or edges can be present on the fastener members since they damage the membrane.

Another problem that exists with present roof fastening systems is that for most fasteners, the top plate should be drawn into clamping engagement with the bottom plate with a particular clamping or compression force on the membrane to prevent damaging the membrane or from damaging either of the retainer plates, or from effecting the anchoring stability of the lower retainer plate on the roof. Still another problem that exists in such dual retainer plate fastener systems is that the uplifting wind forces exerted on the lower plate will cause the anchoring member to back out or loosen from its anchoring in the roof. The lower plate will ultimately become completely separated from the roof structure or the anchoring fastener will pierce the membrane thus causing a leak.

The problem of providing the proper amount of compression force on the membrane is recognized in U.S. Pat. No. 4,545,270 which attempts to solve it by providing a clamping washer with a crushable region in the load distributing flange portion thereof. This crushable region insures that the joint is loaded with predetermined force to reduce the likelihood of overdriving or underdriving the fastener. Still another problem with prior art fastener systems is that many of them require a mastic sealing material to insure a leakproof seal which is both costly and time consuming.

DISCLOSURE OF THE INVENTION

Objectives of the invention include providing an improved mechanical fastener for a roofing membrane and a method of applying the same in which a plurality of the fasteners can be placed in various arrangements over the roof surface to provide the required holding power; and in which the fasteners can be installed in a minimum amount of time and in an extremely efficient manner while reducing the possibility of fasteners being installed incorrectly by use of a frangible portion on the locking element of the fastener and in most locations without requiring the use of any lubricants or mastic materials to provide a satisfactory watertight connection with the elastomeric membrane.

Another objective of the invention is to provide such an improved fastener and method in which a lower retainer member of the fastener is rigidly attached to the roof at selected locations, preferably with one securing anchor, after which the membrane is spread over the roof and the attached lower members followed by the subsequent mounting of an upper retainer member or plate on each of the lower members which traps and secures the membrane therebetween; and in which the top retainer plate is secured in locked position by a threaded fastener having the frangible top portion to insure that the correct compressive force is exerted on the membrane.

Still another objective of the invention is to provide such an improved fastener and method in which the frangible top portion of the threaded fastener retards the unauthorized removal of the top retainer plate after installation since no easily grasped surface is available for engagement with a tool for removal of the fastener.

Another objective of the invention is to provide such a fastener and method in which the upper and lower retainer plates are provided with a series of annular alternating ridges and valley grooves which cooperate with each other upon compressing the membrane therebetween to form a plurality of annular loading and unloading zones on the membrane which increase the holding efficiency achieved by the joined retainer plates; in which the ridges and grooves have smooth convex and concave surfaces free of any sharp corners or projections which would damage the membrane; in which the radii of the convex ridges are smaller than the radii of the concave valleys resulting in a series of spaced nonmating areas when the plates are joined which provide reduced clamping force zones on the membrane; in which a mechanical advantage is achieved by the spaced load and unload zones to resist wind pullout of the membrane and retard wind uplift forces exerted on the membrane by changing the direction of the clamping force on the membrane; and in which the nonmating areas of the valleys and grooves enable the fasteners to be engaged with the membrane at splices if necessary without reducing the holding effect provided thereby.

Still another objective of the invention is to provide such an improved fastener and method in which the members can be formed of noncorrosive reinforced synthetic material for guaranteed long life of a system, which does not require special tools or skilled labor for installation of the fasteners; in which the membrane is pierced by a sharp annular edge on the threaded fastener as it advances into engagement within the lower retainer plate, with the severed portion of the membrane being retained between the top of the fastening anchor of the lower plate and the bottom of the threaded fastener so it does not effect the operation of the fastener and compressive force exerted on the trapped membrane; and in which the threaded fastener is positioned above the lower anchor to prevent the anchor from backing out of engagement with the roof substrate due to the repeated uplifting wind forces exerted on the fastening anchor.

A still further objective of the invention is to provide such an improved fastener which can be mass produced relatively inexpensively yet provide an extremely sturdy and durable member which will secure the membrane to the roof and will retain the membrane in the installed position over a considerable period of time without damage to the membrane and which will enable the membrane to withstand the required wind uplift forces without additional ballast, tiedown, or fastening members, and in most locations without the use of lubricants or mastic sealing material to prevent damage and leaks in the membrane as required in certain prior art fastening systems. Another objective is to provide such a fastener which can be used with a range of material thicknesses, and in which the fastener is able to be used on any flat or regular roof geometry such as dome-shaped roofs since the fastener can be placed at various positions on the roof with the flexible membrane conforming to the shape and configuration of the roof.

These objectives and advantages are obtained by the improved mechanical fastener of the invention, the general nature of which may be stated as including a penetrating fastening and sealing device for both mechanicallly sealing a flexible elastomeric sheet to the upper surface of a roof and sealingly engaging said sheet wherein said device includes a rigid lower retainer having a bottom surface and an upper surface, said upper surface being formed with a hole and an upstanding central boss surrounding said hole, said boss having an internally threaded surface, and a plurality of annular concentric alternating grooves and ridges formed in said upper surface and extending about the central boss; anchoring means for securing the lower retainer to the upper surface of the roof; a rigid upper retainer having a bottom surface and an upper surface and formed with a central hole, said bottom surface having a plurality of annular concentric alternating grooves and ridges extending concentrically about the central hole, said grooves and ridges being located within respective ridges and grooves formed on the top surface of the lower retainer to provide a series of alternating annular gripping zones and unloading zones for the elastomeric sheet secured therebetween; and separate fastener means extending through the hole formed in the upper retainer and engaged with the internally threaded surface of the lower retainer for drawing said retainer against each other to sealingly secure the elastomeric sheet between the cooperation ridges and grooves of said retainers to provide the alternating zones, said fastener means having a frangible upper portion which separates from the fastener means upon a certain sealing force being exerted against the elastomeric sheet.

The objectives and advantages are further obtained by the improved method of the invention, the general nature of which may be stated as a method for mechanically securing a flexible elastomeric sheet to the upper surface of a roof via the use of a plurality of spaced fastening devices, each of said fastening devices includes a base plate and a top plate with each of said plates having a series of annular concentric alternative grooves and ridges extending about a central opening formed in each of the plates; a threaded boss on the base plate surrounding the central opening; and a threaded fastener having a frangible portion; said method comprising the steps of anchoring a plurality of the base plate at spaced locations to the upper surface of the roof; spreading the flexible elastomeric sheet over the roof upper surface and anchored base plates; placing a top plate on the elastomeric sheet above the threaded boss of each of the base plates; piercing the elastomeric sheet above the threaded boss to form an aperture in the sheet; and securing the top plate to the anchored base plate by advancing the threaded fastener through the central opening in the top plate and through the sheet aperture and into engagement with the threaded boss to draw the top plate toward the base plate until the frangible portion of the fastening means separates therefrom with the annular grooves of the top and base plates cooperating with each other to clamp and secure the elastomeric sheets therebetween at a plurality of annular gripping zones.

BRIEF DESCRIPTION OF THE DRAWINGS

A preferred embodiment, illustrative of the best mode in which applicant has contemplated applying the principles, is set forth in the following description and is shown in the drawings and is particularly and distinctly pointed out and set forth in the appended claims.

Similar numerals refer to similar parts throughout the drawings.

BEST MODE FOR CARRYING OUT THE INVENTION

Figure 1:
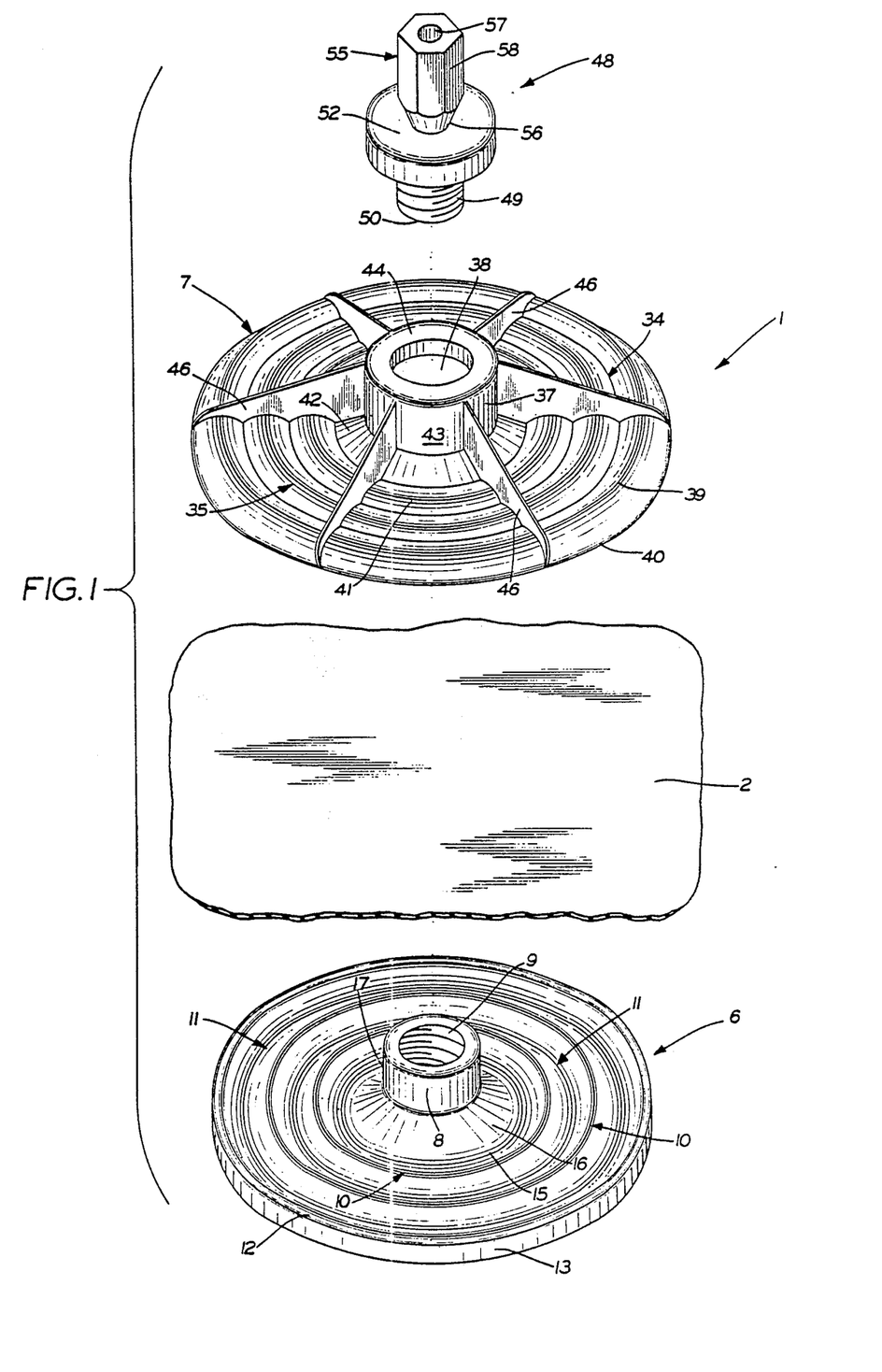
FIG. 1 is an exploded perspective view showing the improved roof fastener for securing the flexible membrane on a roof, a portion of the membrane being shown therein.
Figure 2:
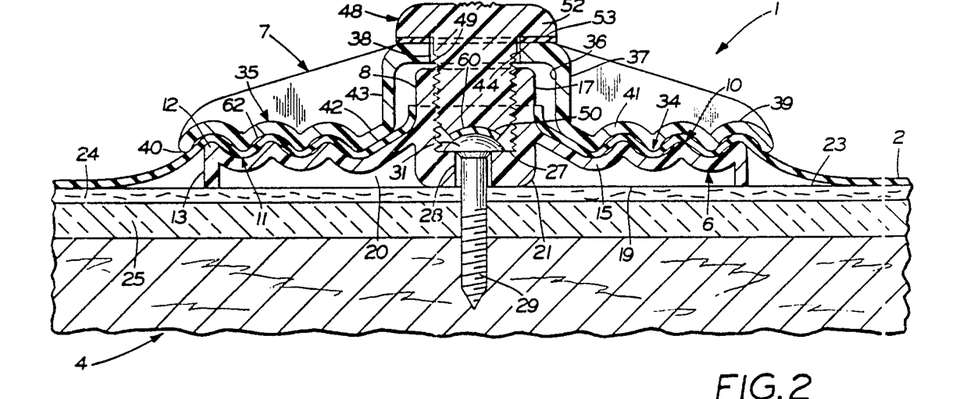
FIG. 2 is a sectional view showing the improved fastener of FIG. 1 securing a membrane on the roof.

The improved mechanical fastener of the invention is indicated generally at 1, and is shown in an exploded position in FIG. 1 together with a portion of a roof membrane 2. Fastener 1 is shown in FIG. 2 securing membrane 2 onto the upper surface of a roof indicated generally at 4. In a typical installation, a plurality of fasteners 1 will be spaced in a predetermined fashion on the roof surface, the number of which is depended upon the particular thickness of the membrane, the roof configuration and the various wind uplift forces which will be exerted on the membrane.

Figures 3, 4:
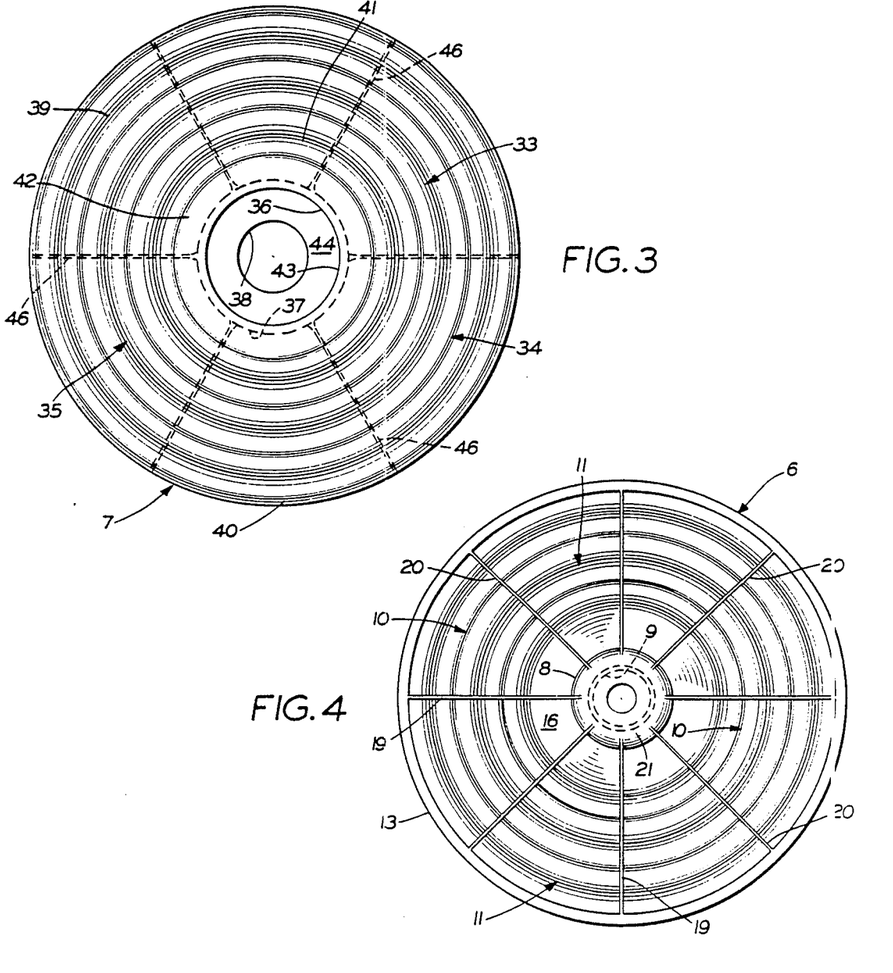
FIG. 3 is a bottom plan view of the top plate portion of the improved fastener.
FIG. 4 is a bottom plan view of the bottom plate portion of the improved fastener.

Fastener 1 includes a rigid lower disc-shaped retainer member or base plate indicated generally at 6 (FIGS. 1 and 4), and a rigid disc-shaped top or upper retainer plate indicated generally at 7 (FIGS. 1 and 3). Base plate 6 is formed with an annular upstanding central boss 8 having an internal threaded surface 9. The top surface of base plate 6 is formed with a plurality of alternating ridges and grooves indicated generally at 10 and 11, respectively. The ridges and grooves extend in a concentric annular arrangement about central boss 8 and are shown particularly in FIG. 6. Each groove 11 has a smooth concave surface which has a considerably larger radius of curvature than that of the smooth convex configuration of ridges 10 when viewed in cross section. Grooves 11 are separated by ridges 10 with the outermost ridge 12 terminating in an outer cylindrical downturned peripheral wall 13. The innermost groove indicated at 15, merges into a conical surface 16 which merges into a cylindrical wall 17 which forms central boss 8.

Figure 5:
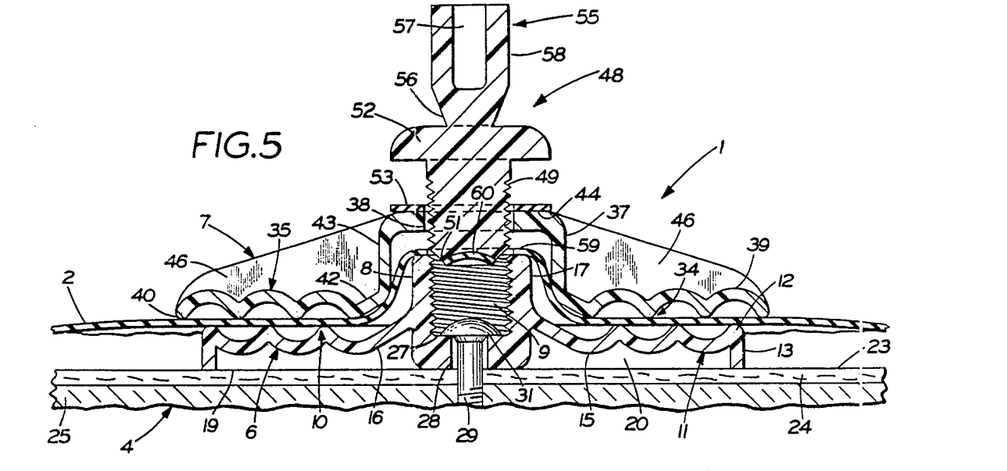
FIG. 5 is a sectional view of the bottom plate portion of the improved fastener.
Figure 6:
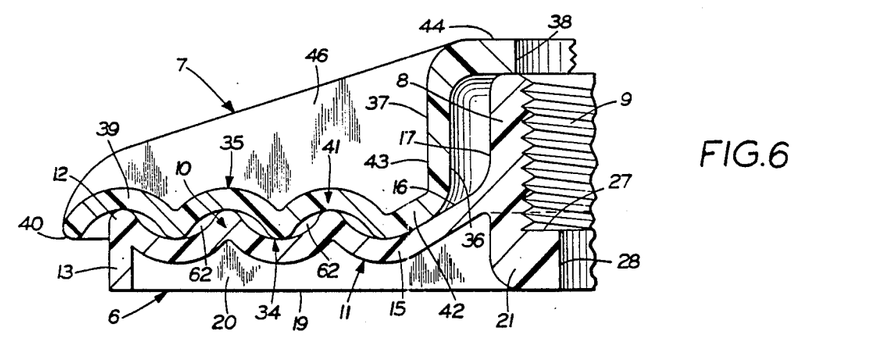
FIG. 6 is an enlarged fragmentary sectional view showing a portion of the upper and lower plates in engaged position with the membrane being removed therebetween.

The bottom surface of base plate 6 (FIG. 4) preferably follows the general undulating shape and contour of the top surface containing ridges 10 and grooves 11, and in addition contains a plurality of radially extending stiffening ribs 20. Ribs 20 are formed integrally with bottom annular portion 21 of central boss 8 and with the bottom surface of base plate 6 and have axial lengths equal to that of peripheral wall 13 (FIG. 6). Bottom edges 19 of ribs 20 lie on the same plane as the bottom edge of peripheral end wall 13 and the bottom of central boss portion 21 and are adapted to engage and lie on top surface 23 of roof 4 (FIGS. 2 and 5). Roof 4 may be covered with a sheet of insulation 24 and a top roof panel 25 as shown in the drawings or have other structural configurations without effecting the operation of fasteners 1.

Internal threaded surface 9 of central boss 8 terminates in an annular bottom shoulder 27 (FIG. 6) which surrounds a reduced diameter central hole 28 which extends through bottom portion 21. An anchoring device 29 (FIG. 1) extends through hole 28 and is driven into the roof for securing base plate 6 thereon. Anchoring devices 29 can be screws or toggle bolts, each of which preferably will have a threaded shank and a head 31.

Top retainer plate 7 (FIGS. 1 and 3) preferably is disc-shaped having a bottom surface indicated generally at 33, which is formed with a plurality of alternating annular ridges and grooves indicated generally at 34 and 35, respectively, extending concentrically about an enlarged central opening 36 formed by an upstanding central boss 37 having a reduced diameter top opening 38. Ridges 34 and grooves 35 are similar in configuration and shape when viewed in cross section to ridges 10 and grooves 11 of base plate 6. Each ridge 34 is formed by a smooth convex surface which merges into the smooth concave surfaces forming grooves 35 with the radius of curvature of each ridge 34 being greater than the radius of curvature of each groove 35.

Figures 7, 8:
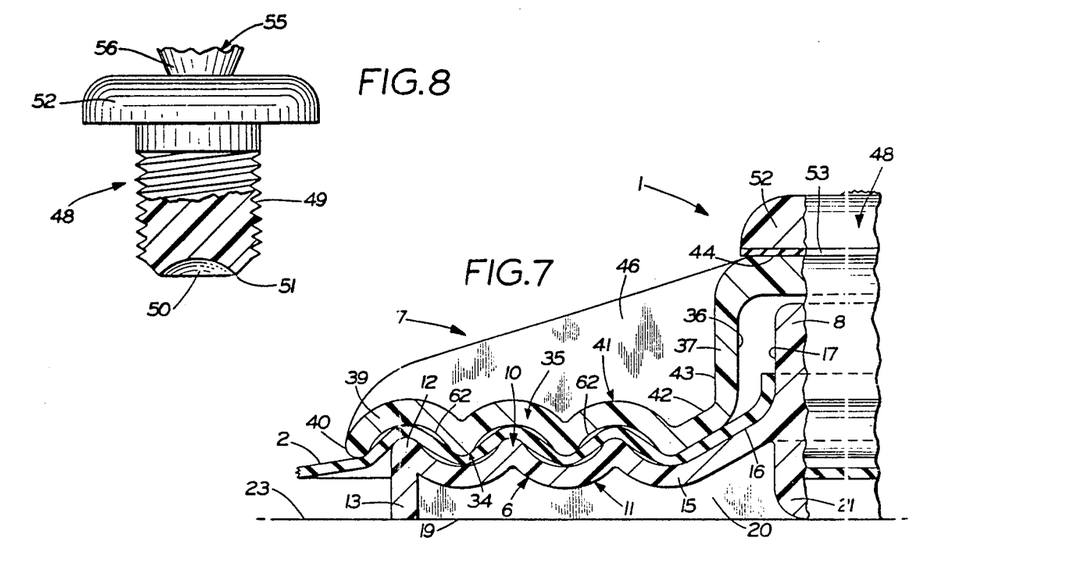
FIG. 7 is an enlarged fragmentary sectional view similar to FIG. 6 but with the membrane clamped between the upper and lower plates.
FIG. 8 is a fragmentary view with portions broken away and in section of the fastening member for securing together the top and bottom plate portions of the improved fastener.

The outermost groove indicated at 39 (FIG. 6) aligns with outermost ridge 12 of bottom plate 6 and extends radially beyond forming a downturn peripheral edge 40 on top plate 7. The innermost groove 41 of top plate 7 merges into a conical portion 42 which merges into cylindrical wall 43 which forms central boss 37. Cylindrical sidewall 43 terminates in an annular top wall 44 in which top opening 38 is formed. A plurality of stiffening ribs 46 are formed integrally with cylindrical wall 43 of central boss 37 and the top surface of plate 7 and extend radially outwardly therefrom along the top surface terminating at downturn peripheral edge 40 (FIGS. 6 and 7). Ribs 46, as do ribs 20 on bottom plate 7, provide considerable stiffening to the respective plates without materially increasing the weight and cost thereof.

A threaded fastener indicated generally at 48 (FIGS. 1, 5 and 8) has a threaded shaft 49 which terminates in a concave bottom end 50 surrounded by a relatively sharp annular cutting edge 51, the purpose of which is described in greater detail below. Threaded shaft 49 extends downwardly from the bottom of an annular flange 52, which flange press a resilient sealing washer 53 against surface 44 of top plate 7 when joined with bottom plate 6.

In accordance with one of the features of the invention a top frangible portion indicated at 55, is formed integrally with flange 52 by a reduced diameter portion 56. Frangible portion 55 is adapted to break away from flange 52 as shown in FIG. 2, upon the rotational pressure applied thereto reaching a predetermined amount. Frangible portion 55 may include a center recess 57 and has a hexagonal or other multisided configuration formed by flat areas 58 to provide a tool gripping surface.

A plurality of base plates 6 are placed in a spaced relationship throughout the top surface of the roof on insulation panel 24. The number of base plates 6 and their location will depend upon the size of mechanical fastener 1, the thickness and size of membrane 2, the particular construction of roof 4, and the particular wind uplift forces loads to which the membrane is designed to withstand. Base plate 6 is secured with a single anchor 29 through center mounting hole 28. After the desired number of base plates 6 are secured to the roof, membrane 2 is laid open the installed base plates and workmen will then install top plate 7 and threaded fastener 48 at each base plate location. Referring to FIG. 5, top plate 7 is placed above retainer base plate 6 and pressed slightly downwardly to stretch an area 59 of membrane 2 over top wall 44 of central boss 8. Threaded fastener 48 is advanced downwardly into threaded engagement with internal threaded surface 9 severing a disc-shaped portion 60 from membrane 2 which falls downwardly and covers head 31 of anchoring device 29. Continued advancement of fastener 48 along internally threaded surface 9 is accomplished by means of a tool engaged with top frangible portion 55 of fastener 48 until a sufficient clamping pressure is exerted by top plate 7 against bottom plate 6 and against intervening membrane 2 as shown in FIG. 2 until a predetermined torquing force is applied to fastener 48 sufficient to separate top frangible portion 55 from flange 52 at the reduced diameter portion 56.

In the clamped position of FIG. 2, flange 52 will compress resilient washer 53 against top wall 44 to enhance the sealing effect of fastener flange 52 with top plate 7. Concave bottom end 50 of fastener 48 will trap the severed disc-shaped portion 60 of membrane 2 in position above anchor head 31 preventing the severed portion from interfering with the clamping engagement achieved by fastener 48. In addition, fastener end 50 and severed resilient disc 60 prevents anchor 29 from backing out of its engagement with roof 4 as occurs in prior art fasteners due to the continuous movement of membrane 2 of the fasteners during wind loads. The breaking away of frangible top portion 55 from the remainder of threaded fastener 48 upon a predetermined torque being exerted thereon, insures that the desired amount of compressive force is exerted by the annular ridges 10, 34 compressing membrane 2 against the bottoms of the aligned concave grooves 11, 35, respectively. One of the main features of the invention which is shown particularly in FIGS. 6 and 7, is the cooperation of annular ridges and grooves 10 and 11 of base plate 6 with ridges and grooves 34 and 35, respectively, of top plate 7 when secured thereagainst by fastener 48. This relationship is shown in FIG. 6 without membrane 2 being shown therein. The smaller radii of curvature of the ridges of both plates form a series of spaced annular contact zones with the aligned bottom surfaces of the grooves of both places and since the grooves have larger radii of curvature, spaces or void areas 62 are formed adjacent thereto. This provides for a series of loading and unloading zones on the membrane when compressed therebetween as shown in FIG. 7. This is in contrast to prior art fasteners in which the mating surfaces of the two retainer members are complementary to each other and provide a generally continuous contact area throughout the joined surfaces. This arrangement of alternating loading and unloading or gripping and reduced gripping zones, provide a mechanical advantage and increased holding power for the membrane trapped therebetween in contrast to a continuous mating surface which would be provided if the surfaces were complementary to each other throughout the general area of engagement. Also, mating conical surfaces 16 and 42 as shown in FIG. 7 further clamp the elastomeric sheet therebetween. Thus as can be seen in FIG. 7, a highly efficient seal is provided to prevent the entrance of moisture between the clamped plates, in addition to the physical securing of the clamped membrane therebetween. The smooth surfaces of the ribs and grooves and conical surfaces 16 and 42 and rounded down-turned peripheral edge 40 reduce the possiblility of damaging the trapped portions of membrane 2 which can occur in prior art fasteners. Furthermore, resilient washer 53 provides a satisfactory weather-proof seal for fastener 48 and top plate 7 without and mastic or sealant. A mastic or sealant may be used only if the fastener is used at a factory membrane splice.

In terms of the method or process for utilizing fastener 1, a plurality of base plate 6 are secured to roof 4 by anchors 29 after which membrane 2 is layed over the roof and base plates. Top plate 7 is placed over each base plate location and the elastomeric sheet is pierced by the sharp annular edge 51 of threaded fastener 48 as it is advanced axially downwardly into the hollow interior of central boss 8 of base plate 6. Fastener 48 is threadably advanced along internally threaded surface 9 by engagement of a tool with frangible top portion 55 until a predetermined amount of compressive clamping force is exerted by top plate 7 against base plate 6 and trapped membrane 2 after which reduced diameter portion 56 of fastener portion 58 separates from flange 52. This leaves only the rounded exposed flange 52 as shown in FIG. 2, which is difficult to grip with a standard tool such as pliers or screwdriver thus retarding the unauthorized removal of fastener 48 and correspondingly top plate 6 by an intruder or vandal, further increasing the effectiveness of improved fastener 1.

The location of each base plate is readily detected by a slight upward bulge of the membrane at each plate location and a workmen can easily see and feel central boss 8 for installing top plate 7 and fastener 48 manually or with an appropriate installation tool.

Base plate 6, top plate 7 and fastener 48 preferably are made of a rigid plastic material or a lightweight metal and the sealing action provided by the spaced annular compression zones eliminate the need for any additional sealing mastic materials or lubricants as required in some prior art fasteners to achieve a satisfactory weatherproof seal and mating engagement of the separate fastener components.

Accordingly, the improved fastener and method provides top and bottom plates which grip the membrane and unload the wind uplift forces exerted thereon by the alternating annular compression zones to produce excellent wind uplift resistant characteristics; provides locking cap fastener 48 with its twistoff torque limiter to facilitate correct installation torque; provides the anti-backup engagement of the concave bottom end of fastener 48 with anchor head 31 to lock the anchor into the roof; enables the top and bottom plates and fastener to be formed of a noncorrosive reinforced plastic material to guarantee a long life for the system; and requires no special tools for installation, generally requiring only a variable speed drill with a nut runner bit and a predetermined sized socket.

Accordingly, the improved mechanical roof fastener is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved mechanical roof fastener is constructed and used, the characteristics of the construction, and the advantageous, new and useful results obtained; the new and useful structures, devices, elements, arrangements, parts, and combinations, are set forth in the appended claims.

What is claimed is:

1. A penetrating, fastening and sealing device for both mechanically securing a flexible elastomeric sheet to the upper surface of a roof, and sealingly engaging said sheet, said device including:
   (a) a rigid lower retainer having a bottom surface and an upper surface, said upper surface being formed with a hole and an upstanding central boss surrounding said hole, said boss having an internally threaded surface, and a plurality of annular concentric alternating grooves and ridges formed in said upper surface and extending about the central boss;
   (b) anchoring means for securing the lower retainer to the upper surface of the roof;
   (c) a rigid upper retainer having a bottom surface and an upper surface and formed with a central hole, said bottom surface having a plurality of annular concentric alternating grooves and ridges extending concentrically about the central hole, said grooves and ridges being located within respective ridges and grooves formed on the top surface of the lower retainer to provide a series of alternating annular gripping zones and unloading zones for the elastomeric sheet secured therebetween, said upper and lower grooves and ridges being smooth concave in cross section with said ridges having smaller radii of curvature than that of said grooves whereby annular spaces are formed between adjacent annular gripping zones to provide said annular unloading zones; and
   (d) separate fastener means extending through the hole formed in the upper retainer and engaged with the internally threaded surface of the lower retainer for drawing said retainers against each other to sealingly secure the elastomeric sheet between the cooperating ridges and grooves of said retainers to provide said alternating zones, said fastener means having a frangible upper portion which separates from the fastener means upon a certain sealing force being exerted against the elastomeric sheet.

2. The device defined in claim 1 in which an upstanding boss is formed on the upper retainer surrounding the central hole thereof; and in which a plurality of radially extending stiffening ribs are formed integrally with the top surface of the upper retainer and said boss.

3. The device defined in claim 1 in which an elastomeric seal is located between the fastener means and upper retainer.

4. The device defined in claim 3 in which an upstanding annular boss is formed on the upper retainer and surrounds the central hole; in which the fastener means has an annular flange; and in which the elastomeric seal is compressed between said boss and flange when the retainers are drawn against each other.

5. The device defined in claim 1 in which a plurality of radially extending stiffening ribs are formed on the bottom surface of the lower retainer.

6. The device defined in claim 5 in which the stiffening ribs extend below undulating areas of the bottom surface of the lower retainer, which areas form the alternating groove and ridges of said lower retainer; and in which said ribs are adapted to engage the upper surface of the roof when the lower retainer is secured thereon by the anchoring means.

7. The device defined in claim 6 in which the lower retainer terminates in an annular downwardly extending peripheral edge connected to the stiffening ribs; and in which said ribs and peripheral edge generally terminate in a common plane.

8. A penetrating, fastening and sealing device for both mechanically securing a flexible elastomeric sheet to the upper surface of a roof, and sealingly engaging said sheet, said device including:

(a) a rigid lower retainer having a bottom surface and an upper surface, said upper surface being formed with a hole and an upstanding central boss surrounding said hole, said boss having an internally threaded surface, and a plurality of annular concentric alternating grooves and ridges formed in said upper surface and extending about the central boss;

(b) anchoring means for securing the lower retainer to the upper surface of the roof;

(c) a rigid upper retainer having a bottom surface and an upper surface and formed with a central hole, said bottom surface having a plurality of annular concentric alternating grooves and ridges extending concentrically about the central hole, said grooves and ridges of the upper retainer being located within respective ridges and grooves formed on the top surface of the lower retainer to provide a series of alternating annular gripping zones and unloading zones for the elastomeric sheet secured therebetween;

(d) separate fastener means extending through the hole formed in the upper retainer and engaged with the internally threaded surface of the lower retainer for drawing said retainers against each other to sealingly secure the elastomeric sheet between the cooperating ridges and grooves of said retainers to provide said alternating zones, said fastener means having a threaded shaft and a frangible upper portion which separates from the fastener means upon a certain sealing force being exerted against the elastomeric sheet; and (e) cutting means for cutting an aperture in the elastomeric sheet for passage of the fastener means therethrough for drawing the retainers against each other, said cutting means comprising a sharp annular edge located on an edge of the threaded shaft of the fastener means.

9. The device in claim 8 in which said end of the threaded shaft has a concave recess formed therein which aligned with a top end of the anchoring means; and in which a portion of the elastomeric sheet, severed from said sheet by the cutting means, is retained between said top end of the anchoring means and said concave recess when the retainers are drawn against each other.

10. A method of mechanically securing a flexible elastomeric sheet to the upper surface of a roof via the use of a plurality of spaced fastening devices, each of said fastening devices includes a base plate and a top plate with each of said plates having a series of annular concentric alternative grooves and ridges extending about a central opening formed in each of the plates; a central opening formed in the top plate and a threaded boss on the base plate surrounding the central opening; and a fastener having a threaded shaft terminating in a sharp annular cutting edge and a frangible upper portion; said method comprising the steps of:

(a) anchoring a plurality of the base plates at spaced locations to the upper surface of the roof;

(b) spreading the flexible elastomeric sheet over the roof upper surface and anchored base plates;

(c) placing a top plate on the elastomeric sheet above the threaded boss of each of the base plates;

(d) inserting the threaded shaft through the central opening of the top plate and into engagement with the elastomeric sheet;

(e) piercing the elastomeric sheet above the threaded boss with the cutting edge of the shaft to form an aperture in the sheet; and (f) securing the top plate to the anchored base plate by rotatably advancing the threaded fastener through the central opening in the top plate and through the sheet aperture and into engagement with the threaded boss to draw the top plate toward the base plate until the frangible portion of the fastening means separates therefrom with the annular grooves of the top and base plates cooperating with each other to clamp and secure the elastomeric sheets therebetween at a plurality of annular gripping zones.

11. The method defined in claim 10 including the step of sealing the threaded fastener with respect to the central opening of the top plate.

12. The method defined in claim 10 in which the anchoring step includes utilizing a linear fastener extending through the central hole formed in the base plate and into the upper surface of a roof.

13. The method defined in claim 12 wherein said piercing step includes forming a severed portion of the elastomeric sheet and locating it between the anchoring fastener and a concave bottom end of the threaded fastener.

14. A penetrating, fastening and sealing device for both mechanically securing a flexible elastomeric sheet to the upper surface of a roof, and sealingly engaging said sheet, said device including:

(a) a rigid lower retainer having a bottom surface with a plurality of radially extending stiffening ribs formed thereon and an upper surface, said upper surface being formed with a hole and an upstanding central boss surrounding said hole, said boss having an internally threaded surface, and a plurality of annular concentric alternating grooves and ridges formed in said upper surface and extending about the central boss;

(b) anchoring means for securing the lower retainer to the upper surface of the roof;

(c) a rigid upper retainer having a bottom surface and an upper surface and formed with a central hole, said bottom surface having a plurality of annular concentric alternating grooves and ridges extending concentrically about the central hole, said grooves and ridges being located within respective ridges and grooves formed on the top surface of the lower retainer to provide a series of alternating annular gripping zones and unloading zones for the elastomeric sheet secured therebetween; and (d) separate fastener means extending through the hole formed in the upper retainer and engaged with the internally threaded surface of the lower retainer for drawing said retainers against each other to sealingly secure the elastomeric sheet between the cooperating ridges and grooves of said retainers to provide said alternating zones, said fastener means having a frangible upper portion which separates from the fastener means upon a certain sealing force being exerted against the elastomeric sheet.

15. A penetrating, fastening and sealing device for both mechanically securing a flexible elastomeric sheet to the upper surface of a roof, and sealingly engaging said sheet, said device including:

(a) a rigid lower retainer having a cylindrical downturned peripheral end wall and a bottom surface and an upper surface, said upper surface being formed with a hole and an upstanding central boss surrounding said hole, said boss having an internally threaded surface, and a plurality of annular concentric alternating grooves and ridges formed in said upper surface and extending about the central boss;

(b) anchoring means for securing the lower retainer to the upper surface of the roof;

(c) a rigid upper retainer terminating in an annular downturned peripheral edge and having a bottom surface and an upper surface formed with a central hole, said bottom surface having a plurality of annular concentric alternating grooves and ridges extending concentrically about the central hole, said grooves and ridges being located within respective ridges and grooves formed on the top surface of the lower retainer to provide a series of alternating annular gripping zones and unloading zones for the elastomeric sheet secured therebetween, and with said peripheral edge of the upper overlying and being located radially beyond the peripheral end wall of the lower retainer; and (d) separate fastener means extending through the hole formed in the upper retainer and engaged with the internally threaded surface of the lower retainer for drawing said retainers against each other to sealingly secure the elastomeric sheet between the cooperating ridges and grooves of said retainers to provide said alternating zones, said fastener means having a frangible upper portion which separates from the fastener means upon a certain sealing force being exerted against the elastomeric sheet.

16. A mechanical fastener for securing a flexible elastomeric sheet to the upper surface of a roof; said fastener including:

(a) a base plate adapted to be secured to the upper surface of the roof and underlie the elastomeric sheet, said base plate being formed with a series of annular grooves and intervening ridges in a top surface thereof;

(b) anchoring means for securing the base plate to the upper surface of the roof;

(c) an opposed top plate mounted on the base plate for placing and maintaining the elastomeric sheet located therebetween in a sealingly secured relationship, said top plate being formed with a series of annular grooves and intervening ridges in a bottom surface thereof, said grooves having smooth concave surfaces in cross section with said ridges having smooth convex surfaces in cross section with smaller radii of curvature than that of the grooves, said ridges of each of the plates compressing the elastomeric sheet against areas of adjacent grooves of the respective opposite plates to form a series of concentric annular zones of compression with alternating annular zones of greater and reduced sealing pressure, said zones of greater sealing pressure being located at the area of engagement of the ridges with the respective grooves; and (d) fastener means for securing the top plate on the base plate in the sealingly secured relationship.

17. The fastener defined in claim 16 in which the fastener means includes a frangible portion which separates from the fastener means upon the top plate being secured on the base plate to retard unauthorized subsequent removal of the fastener means.

18. The fastener defined in claim 17 in which the base plate is formed with an upstanding projection which is adapted to extend through an aperture formed in the elastomeric sheet; and in which the fastener means is engaged with the projection for mounting the top plate on the base plate.

19. The fastener defined in claim 18 in which the upstanding projection of the base plate is internally threaded and is located within an upstanding projection formed on the top plate; and in which the fastener means has a threaded shaft and an annular flange located between said shaft and frangible portion, with said flange being in sealing engagement with the upstanding projection of the top plate.

20. The fastener defined in claim 17 in which a sealing washer is located between the sealing flange and upstanding projection of the top plate.

21. The fastener defined in claim 17 in which the fastener means has a tool gripping area attached to the annular flange and a reduced thickness area, which area provides the frangible portion of the fastener means.

22. The fastener defined in claim 17 in which the threaded shaft terminates in a sharp edge which forms the aperature in the elastomeric sheet upon engagement of the shaft with the upstanding projection of the base plate.

* * * * *

UNITED STATES PATENT AND TRADEMARK OFFICE
CERTIFICATE OF CORRECTION

PATENT NO. : 4,744,187
DATED : MAY 17, 1988
INVENTOR(S) : SCOTT D. TRIPP

It is certified that error appears in the above-identified patent and that said Letters Patent are hereby corrected as shown below:

Column 8, line 58, "without and mastic or..." should be "without any..."

Signed and Sealed this

Twenty-fifth Day of October, 1988

Attest:

DONALD J. QUIGG

*Attesting Officer*  *Commissioner of Patents and Trademarks*